(No Model.)
G. S. & R. W. GRAVES.
APPARATUS FOR SEPARATING GERMS FROM CORN.
No. 357,708. Patented Feb. 15, 1887.
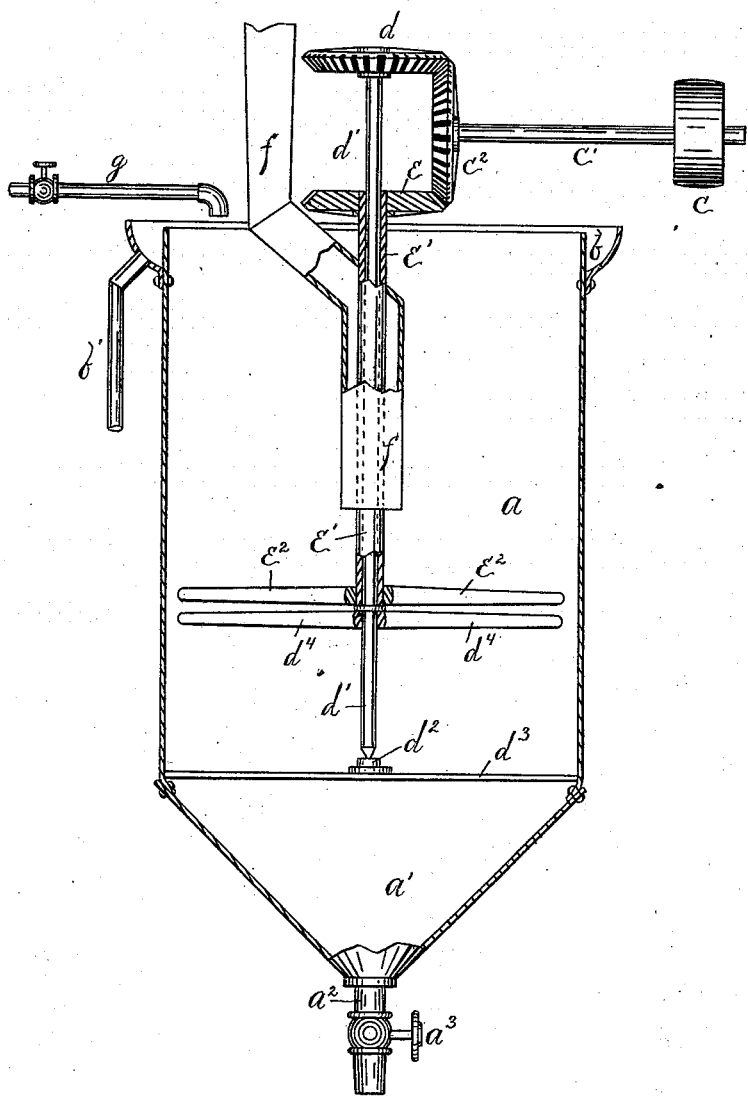
Witnesses:
Otto Hoddick.
Inventors.
Gilbert S Graves
Roger W Graves
By
W. T. Miller
Attorney.

UNITED STATES PATENT OFFICE.

GILBERT S. GRAVES AND ROGER W. GRAVES, OF BUFFALO, NEW YORK.

APPARATUS FOR SEPARATING GERMS FROM CORN.

SPECIFICATION forming part of Letters Patent No. 357,708, dated February 15, 1887.

Application filed October 13, 1886. Serial No. 216,136. (No model.)

*To all whom it may concern:*

Be it known that we, GILBERT S. GRAVES and ROGER W. GRAVES, citizens of the United States, residing at Buffalo, in the county of Erie and State of New York, have invented certain new and useful Improvements in Apparatus for Separating Germs from Corn; and we do hereby declare the following to be a full, clear, and exact description of the invention, such as will enable others skilled in the art to which it appertains to make and use the same, reference being had to the accompanying drawing, and to letters or figures of reference marked thereon, which forms a part of this specification.

Our invention relates particularly to an improved apparatus to be employed in starch-factories for the purpose of separating the germs from the other portions of the grain after such grain has been beaten or broken in a disintegrating-machine or grinding-mill. Prior to our invention such separation has been mechanically effected, and therefore our invention is confined to specific improvements in this class of apparatus, all of which we will now proceed to definitely describe and claim.

The figure of the drawing represents our improved apparatus in elevation, partly sectional and with portions broken away.

Referring to the drawing, $a$ is a vertical cylindrical tank with cone-shaped bottom $a'$, having the discharge-pipe $a^2$, with valve $a^3$, at its inverted apex.

$b$ is an annular gutter extending around the outside of the upper edge of the tank $a$, its upper edge being slightly above the upper edge of the tank.

$b'$ is an outlet-pipe to carry away the contents of the gutter $b$.

$c$ is a pulley mounted upon shaft $c'$, at the end of which is the bevel-gear $c^2$. This bevel-gear $c^2$ intermeshes with the similar bevel-gears, $d$ and $e$. The gear-wheel $d$ is mounted on the vertical shaft $d'$, the lower end of which rests and turns in the socket $d^2$, secured to the cross-piece $d^3$. Upon this shaft $d'$, and at a point preferably below the center of the tank $a$, is rigidly secured the paddle or agitator $d^4$, which revolves with its shaft $d'$. The gear-wheel $e$ is mounted upon the hollow shaft $e'$, which loosely encircles the shaft $d'$. Upon this hollow shaft $e'$ is rigidly secured the paddle or agitator $e^2$. These agitators $d^4$ and $e^2$ are in close proximity to each other and slowly revolve in opposite directions by means of their bevel-gears $d$ and $e$ intermeshing with the bevel-gear $c^2$, operated by the shaft $c'$ and pulley $c$.

$f$ is a hollow leg or conveyer, extending from the disintegrator or grinding-mill (not shown) down into the tank $a$ to a point just above the agitators $d^4$ and $e^2$. The conveyer $f$ encircles the hollow shaft $e'$, as shown, in order that the contents of the conveyer may be centrally discharged into the tank $a$.

$g$ is a pipe, which supplies the tank $a$ with the necessary amount of water.

The previously-steeped corn having been subjected to a beating or grinding action in a disintegrator or mill in order to free the germs from the other parts of the grain, the mass so treated is passed down through the conveyer $f$ and discharged centrally into the tank $a$, while at the same time water from pipe $g$ is being discharged therein. The agitators $d^4$ and $e^2$, being slowly revolved in opposite directions, serve not only to agitate and separate the mass discharged from the conveyer $f$, but also keep the water in the tank continuously level. The agitation of the mass, as just described, enables the released germs to rise to the surface and pass over the upper edge of the tank with the overflowing water. The gutter $b$ receives the overflowing water with its contained germs and starch-milk, and the pipe $b'$ conveys the same to the proper point. The remainder of the mass, consisting of bran and adhering starch, settles to the bottom, and it, with the starch-milk in the tank, is conveyed to the proper apparatus for further treatment.

It will be seen that with our improved apparatus described the previously-liberated germs are thoroughly and continuously separated and conveyed away.

We claim—

1. In the manufacture of starch from grain, the continuous separator consisting, essentially, of a vertical tank into which the mass to be operated upon is discharged, an annular gutter surrounding the upper edge of the tank and provided with a discharge-pipe, a tube or conveyer extending down centrally into the tank to a point at or near the agitators, and the agitators adapted to revolve in opposite directions, substantially as and for the purpose stated.

2. In the manufacture of starch from grain, the continuous separator consisting of the tank $a$, with cone-shaped bottom $a'$, the annular gutter $b$, with discharge-pipe $b'$, the agitators $d^4$ and $e^2$, adapted to revolve in opposite directions, and the conveyer $f$, for discharging the mass to be operated upon into the tank, all combined and operating substantially as shown and described.

In testimony whereof we have signed our names to this specification in the presence of two subscribing witnesses.

GILBERT S. GRAVES.
ROGER W. GRAVES.

Witnesses:
W. T. MILLER,
OTTO HODDICK.